US008799611B2

(12) United States Patent
Foster et al.

(10) Patent No.: US 8,799,611 B2
(45) Date of Patent: *Aug. 5, 2014

(54) MANAGING ALLOCATION OF MEMORY PAGES

(75) Inventors: Alfred F. Foster, Wappingers Falls, NY (US); David Horn, Poughkeepsie, NY (US); Charles E. Mari, Wappingers Falls, NY (US); Matthew J. Mauriello, Fishkill, NY (US); Robert Miller, Jr., Poughkeepsie, NY (US); Mariama Ndoye, Poughkeepsie, NY (US); Michael G. Spiegel, Monroe, NY (US); Peter G. Sutton, Lagrangeville, NY (US); Scott B. Tuttle, Staatsburg, NY (US); Elpida Tzortzatos, Lagrangeville, NY (US); Chun Kwan K. Yee, Woodstock, NY (US)

(73) Assignee: International Business Machines Corporation, Armonk, NY (US)

( * ) Notice: Subject to any disclaimer, the term of this patent is extended or adjusted under 35 U.S.C. 154(b) by 482 days.

This patent is subject to a terminal disclaimer.

(21) Appl. No.: 13/101,791

(22) Filed: May 5, 2011

(65) Prior Publication Data

US 2012/0284483 A1 Nov. 8, 2012

(51) Int. Cl.
*G06F 12/00* (2006.01)
(52) U.S. Cl.
USPC .......................................... 711/170; 711/154
(58) Field of Classification Search
USPC .................. 711/170–173, E12.002, E12.005, 711/E12.013, 154; 345/543
See application file for complete search history.

(56) References Cited

U.S. PATENT DOCUMENTS

| 4,638,424 | A | | 1/1987 | Beglin et al. | |
| 4,771,375 | A | | 9/1988 | Beglin et al. | |
| 5,394,539 | A | | 2/1995 | Neuhard et al. | |
| 5,675,790 | A | * | 10/1997 | Walls | 395/621 |
| 5,784,698 | A | * | 7/1998 | Brady et al. | 711/171 |
| 5,784,699 | A | * | 7/1998 | McMahon et al. | 711/171 |
| 5,784,707 | A | | 7/1998 | Khalidi et al. | |
| 5,813,045 | A | * | 9/1998 | Mahalingaiah et al. | 711/204 |
| 6,061,763 | A | * | 5/2000 | Rubin et al. | 711/129 |
| 6,112,301 | A | | 8/2000 | Johnson | |
| 6,182,089 | B1 | * | 1/2001 | Ganapathy et al. | 707/206 |
| 6,202,134 | B1 | | 3/2001 | Shirai | |
| 6,223,335 | B1 | | 4/2001 | Cartwright, Jr. et al. | |

(Continued)

OTHER PUBLICATIONS

Advanced Operating Systems and Kernel Applications, Y. Wiseman & S. Jiang, Copyright © 2010 by IGI Global, published by Information Science Reference, Hershey, New York, attached as AdvancedOS.pdf.*

(Continued)

*Primary Examiner* — Matthew Bradley
(74) *Attorney, Agent, or Firm* — William A. Kinnaman, Jr., Esq.; Blanche E. Schiller, Esq.; Heslin Rothenberg Farley & Mesiti P.C.

(57) ABSTRACT

Allocation of pages of memory is managed in computing environments that include multiple sized memory pools. Responsive to a request for a page of memory, one or more memory pools are searched for an available frame of memory to service the request. The search uses a predefined order of search, which includes multiple types of memory pools in a specific order based on the requested size of the page of memory.

20 Claims, 5 Drawing Sheets

(56) References Cited

U.S. PATENT DOCUMENTS

| | | | |
|---|---|---|---|
| 6,598,143 B1* | 7/2003 | Baker et al. | 711/200 |
| 6,701,420 B1* | 3/2004 | Hamilton et al. | 711/170 |
| 6,718,445 B1* | 4/2004 | Lewis et al. | 711/159 |
| 6,738,866 B2 | 5/2004 | Ting | |
| 6,782,466 B1* | 8/2004 | Steele et al. | 711/209 |
| 6,889,307 B1 | 5/2005 | Scheuerlein | |
| 6,961,835 B2* | 11/2005 | Lightstone et al. | 711/171 |
| 7,003,647 B2* | 2/2006 | Jacobs et al. | 711/207 |
| 7,080,081 B2 | 7/2006 | Agarwal et al. | |
| 7,225,313 B2 | 5/2007 | Mather et al. | |
| 7,236,974 B2 | 6/2007 | Bhattacharjee et al. | |
| 7,437,529 B2* | 10/2008 | Burugula et al. | 711/171 |
| 7,484,072 B2 | 1/2009 | Hepkin et al. | |
| 7,543,123 B2 | 6/2009 | Evanchik et al. | |
| 7,765,211 B2 | 7/2010 | Bhattacharjee et al. | |
| 7,802,070 B2 | 9/2010 | Cholleti et al. | |
| 8,312,242 B2 | 11/2012 | Casper et al. | |
| 8,417,912 B2 | 4/2013 | Olszewski | |
| 2003/0084266 A1* | 5/2003 | Knippel et al. | 711/170 |
| 2004/0128466 A1* | 7/2004 | Kadohiro | 711/172 |
| 2005/0005080 A1 | 1/2005 | Dunshea et al. | |
| 2006/0004977 A1* | 1/2006 | Jann et al. | 711/160 |
| 2007/0156997 A1 | 7/2007 | Boule et al. | |
| 2008/0104358 A1* | 5/2008 | Noel et al. | 711/170 |
| 2009/0055609 A1* | 2/2009 | Kuczynski et al. | 711/162 |
| 2010/0070733 A1 | 3/2010 | Ng et al. | |
| 2010/0106930 A1 | 4/2010 | Foltz et al. | |
| 2010/0161929 A1 | 6/2010 | Nation et al. | |
| 2010/0211756 A1* | 8/2010 | Kaminski et al. | 711/172 |
| 2011/0087857 A1* | 4/2011 | Bomma et al. | 711/206 |
| 2012/0054466 A1 | 3/2012 | Devendran et al. | |
| 2012/0246386 A1 | 9/2012 | Akutsu et al. | |
| 2012/0284457 A1 | 11/2012 | Foster et al. | |
| 2012/0284458 A1 | 11/2012 | Foster et al. | |
| 2012/0284478 A1 | 11/2012 | Brooker et al. | |
| 2012/0284479 A1 | 11/2012 | Foster et al. | |

OTHER PUBLICATIONS

Aix Version 5.3 Performance Management, published by IBM, Oct. 2009, attached as AIXv5_3.pdf.*
"Using 4KB Page Size for Virtual Memory is Obsolete", P. Weisberg and Y. Wiseman, Published by IEEE IRI, Jul. 2009, attached as Wiesberg.pdf.*
z/OS Basics: Virtual Storage Management Overview, by Tzortzatos, Copyright © 2009 IBM Corporation, attached as BostonSHAREVSM.pdf.*
z/OS Large Page Support, by Walsh, Copyright © 2008 IBM Corporation, attached as zOS_LargePageSupport_Walsh.pdf.*
"z/Architecture—Principles of Operation", IBM Publication No. SA22-7832-08, Aug. 2010.
Foster, Alfred F., et al., "Selecting an Auxiliary Storage Medium for Writing Data of Real Storage Pages," U.S. Appl. No. 13/101,725, filed May 5, 2011.
Brooker, Christopher G., et al., "Managing Storage Extents and the Obtaining of Storage Blocks within the Extents," U.S. Appl. No. 13/101,731, filed May 5, 2011.
Foster, Alfred F., et al., "Managing Large Page Memory Pools," U.S. Appl. No. 13/101,735, filed May 5, 2011.
Office Action for U.S. Appl. No. 13/459,144 dated May 22, 2013, pp. 1-32.
Office Action for U.S. Appl. No. 13/101,725 dated May 5, 2011, pp. 1-46.
Office Action for U.S. Appl. No. 13/101,731 dated Jun. 5, 2013, pp. 1-58.
Siegel, J.J. et al., "Compare Double and Swap Extended Instruction," IPCOM000085697D, Mar. 2005, pp. 1.
Kinkade, J.D., et al., "Compare and Swap Implementation of Task Logic," IPCOM000079473D, Feb. 2005, pp. 1-3.
Office Action for U.S. Appl. No. 13/101,735 dated Jun. 28, 2013, pp. 1-55.
Navarro, Juan et al., "Practical, Transparent Operating System Support for Superpages," Rice University, ACM SIGOPS Operating Systems Review—OSDI'02, vol. 36, Issue SI, Winter 2002 (no further date information available), pp. 89-104.
Subramanian, Indira et al., "Implementation of Multiple Pagesize Support in HP-UX," Proceeddings of the USENIX Annual Technical Conference (No. 98), Jun. 1998, pp. 1-15.
Gopinath, K. et al., "Program Analysis for Page Size Selection," Department of Computer Science & Automation, Indian Institute of Science, Bangalore, Aug. 1996, pp. 189-194.
Wienand, Ian, "A Survey of Large-Page Support," University of New South Sales, 2006 (no further date information available), pp. 1-52.
Qu et al., "GISP: A Transparent Superpage Support Framework for Linux," Microprocessor Research and Development Center, Peking University, Apr. 2007, pp. 359-364.
Zhang, Xiaohui et al., "Performance Improvement for Multicore Processors Using Variable Page Technologies," 2011 Sixth IEEE International Conference on Networking, Architecture and Storage, Jul. 2011, pp. 230-235.
"z/Architecture—Principles of Operation," IBM Document No. SA22-7832-08, Aug. 2010, p. 10-108.
Talluri, Madhusudhan and Mark D. Hill, "Surpassing the TLB Performance of Superpages with Less Operating System Support," University of Wisconsin, Mar. 1994, pp. 171-182.
Wienand, Ian, "Transparent Large-Page Support for Itanium Linux," University of South Wales, Jul. 2008, pp. 1-117.
"z/Os Basic Skills Information Center—z/OS Concepts," IBM Corporation, © 2006, 2010 (no further date information available), pp. 1-117.
Roivier, Theodore Haynes, "Using Virtual Memory to Improve Cache and TLB Performance," University of Washington, 1998 (no further date information available), pp. 1-157.
Wang, Feng, "Storage Management in Large Distributed Object-Based Storage Systems", University of California, Dec. 2006, pp. 1-195.
Matyas, M. et al., "Reversible Data Mixing Procedure for Efficient Public-Key Encryption," Oct. 1998, pp. 1-12.
Scheifler, Robert W., "X Window System Protocol, Version 11, Alpha Update," Jun. 1987, pp. 1-90.
"z/Architecture—Principles of Operation", IBM Publication No. SA22-7832-08, Aug. 2010, pp. 1-1496.
Murray, Bill, "Mixing Formal and Dynamic Verification, Part 1," SCDsource 2007-2010, pp. 1-31 (no further date information available).
Khalidi, Yousef A., et al., "Virtual Memory Support for Multiple Pages," Sun Microsystems Laboratories, Inc., Sep. 1993, pp. 1-7.
Talluri, Madhusudhan, et al., "Tradeoffs in Supporting Two Page Sizes," Jun. 1992, pp. 415-424.
"Intelligent and Automated Allocation/Re-allocation of Paging Space to Enhance the Overall Operating System Performance," IP.com No. IPCOM000153048D, May 2007, pp. 1-4.
Tian, Yi et al., "Efficient Data Placement and Replacement Algorithms for Multiple-Level Memory Hierarchy," Proc. 10th International Conference on Parallel and Distributed Computing Systems, Oct. 1998, pp. 196-201.
Beretvas, Thomas, "Paging Enhancements in VM/SP HPO," pp. 728-737, Dec. 1984.
Knox, Deborah, et al., "Disk Swapping in Paged Distributed Virtual Memory Systems," pp. 153-157, Oct. 1994.

* cited by examiner

MANAGING ALLOCATION OF MEMORY PAGES

BACKGROUND

One or more aspects of the present invention relate, in general, to managing memory of a computing environment, and in particular, to managing the allocation of memory pages.

A computing environment may include main memory, as well as auxiliary storage, such as direct access storage devices (DASD) or flash memory. Main memory includes pages of memory that are backed by real storage, referred to as real storage frames. These pages are ready to be accessed by applications, instructions, operations, or other entities. Main memory is limited in space, and therefore, typically only the most recently used pages of memory are maintained in main memory. The other pages of memory are maintained in auxiliary storage.

There may be various types of memory and sizes of memory that are to be managed. Inefficient management of memory may lead to a decrease in system performance.

BRIEF SUMMARY

The shortcomings of the prior art are overcome and additional advantages are provided through the provision of a computer program product for allocating memory in a computing environment. The computer program product includes a storage medium readable by a processing circuit and storing instructions for execution by the processing circuit for performing a method. The method includes, for instance, receiving a request for a page of memory of a requested size; searching one or more memory pools for an available frame to service the request, the searching using a predefined order of search, the predefined order of search including multiple types of memory pools in a specific order based on the requested size of the page of memory, the searching terminating responsive to finding the available frame; and using the available frame to service the request.

Methods and systems relating to one or more aspects of the present invention are also described and claimed herein. Further, services relating to one or more aspects of the present invention are also described and may be claimed herein.

Additional features and advantages are realized through the techniques of one or more aspects of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of one or more aspects of the invention are apparent from the following detailed description taken in conjunction with the accompanying drawings in which:

DETAILED DESCRIPTION

In accordance with an aspect of the present invention, a technique is provided for allocating pages of memory in computing environments that include multiple sized memory pools. In one example, a predefined order/strategy for page allocation is provided. The use of various memory types and sizes is optimized, particularly during a memory crisis. For instance, if there is a lack of pages of a particular size, then pages of other sizes are used. As an example, if there is a lack of small pages (e.g., 4K pages), then large pages (e.g., 1M pages) are used for small page consumption by demoting the large page into a plurality of consumable small pages (e.g., 256 4K pages). Then, when the crisis is over, a plurality of pages are promoted back to a large page.

Figure 1:
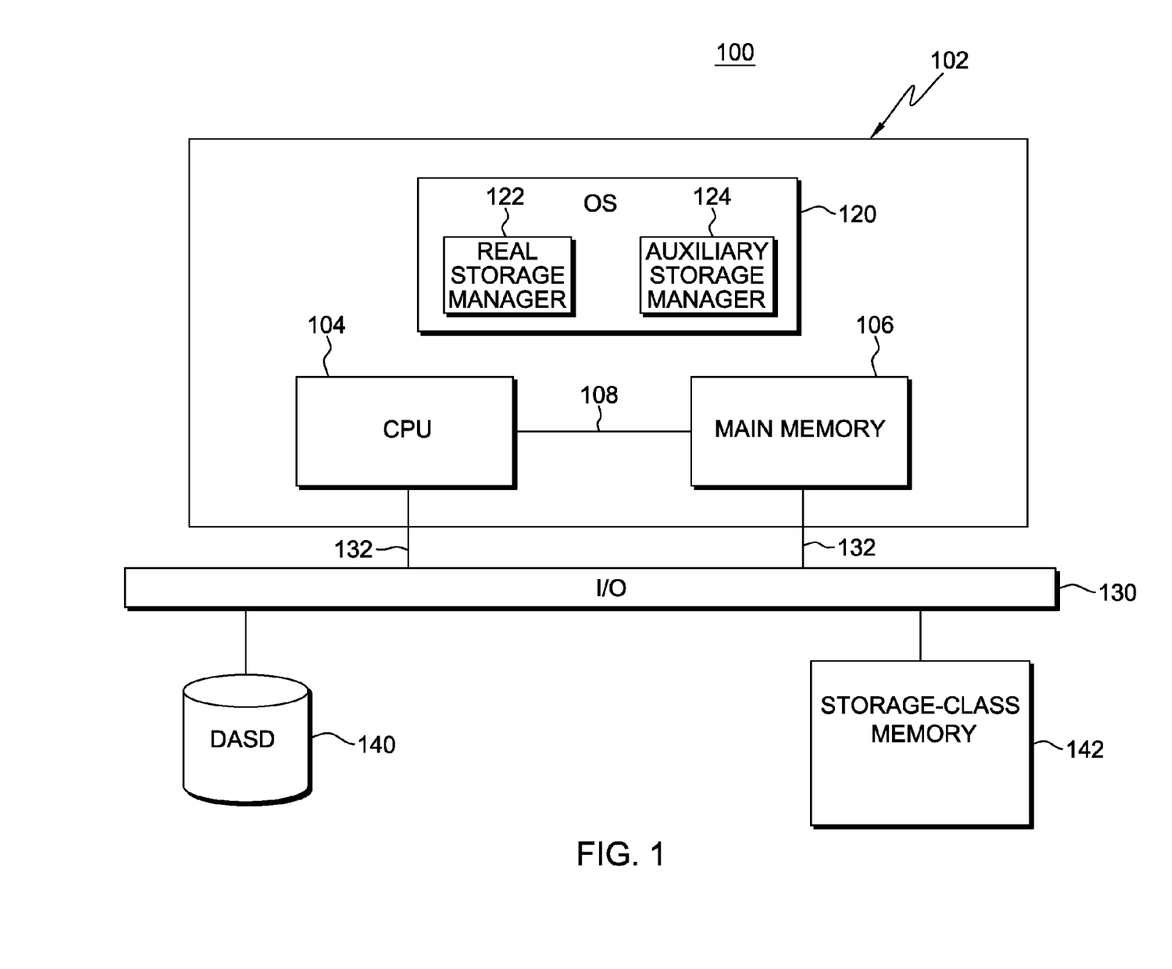
FIG. 1 depicts one example of a computing environment to incorporate and/or use one or more aspects of the present invention.

One embodiment of a computing environment to incorporate and/or use one or more aspects of the present invention is described with reference to FIG. 1. Computing environment 100 is based, for instance, on the Z/ARCHITECTURE® offered by International Business Machines Corporation, Armonk, N.Y. The Z/ARCHITECTURE® is described in an IBM® publication entitled, "z/Architecture Principles of Operation," IBM Publication No. SA22-7832-08, August 2010, which is hereby incorporated herein by reference in its entirety. In one example, a computing environment based on the Z/ARCHITECTURE® includes the ZENTERPRISE 196 (Z196) system, offered by International Business Machines Corporation, Armonk, N.Y. IBM® and Z/ARCHITECTURE® are registered trademarks, and ZENTERPRISE 196 and Z196 are trademarks of International Business Machines Corporation, Armonk, N.Y., USA. Other names used herein may be registered trademarks, trademarks or product names of International Business Machines Corporation or other companies.

As one example, computing environment 100 includes a system 102, such as one or more servers, a central processing complex, etc., that includes, for instance, one or more central processing units (CPUs) 104 coupled to main memory 106 via one or more buses 108. One of the central processing units 104 may execute an operating system 120, such as the Z/OS® operating system offered by International Business Machines Corporation. In other examples, one or more of the central processing units may execute other operating systems or no operating system. Z/OS® is a registered trademark of International Business Machines Corporation, Armonk, N.Y., USA.

Central processing unit(s) 104 and main memory 106 are further coupled to an I/O subsystem 130 via one or more connections 132 (e.g., buses or other connections). The I/O subsystem provides connectivity to one or more auxiliary storage media, including, for instance, one or more direct access storage devices (DASD) 140 and storage-class memory 142 (e.g., flash memory). In one particular example of the z/Architecture®, the I/O subsystem is a channel subsystem. However, the I/O subsystem may be other than a channel subsystem, and the auxiliary storage media may be other than or in addition to DASD and storage-class memory.

Main memory and auxiliary storage are managed, in one example, by managers of operating system 120, including, for instance, a real storage manager (RSM) 122 and an auxiliary storage manager (ASM) 124. Real storage manager 122 is responsible for tracking the contents of main memory and managing the paging activities of main memory. Auxiliary storage manager 124 is responsible for tracking auxiliary storage and for working with the real storage manager to find locations to store real pages that are being paged-out from main memory.

Figure 2:
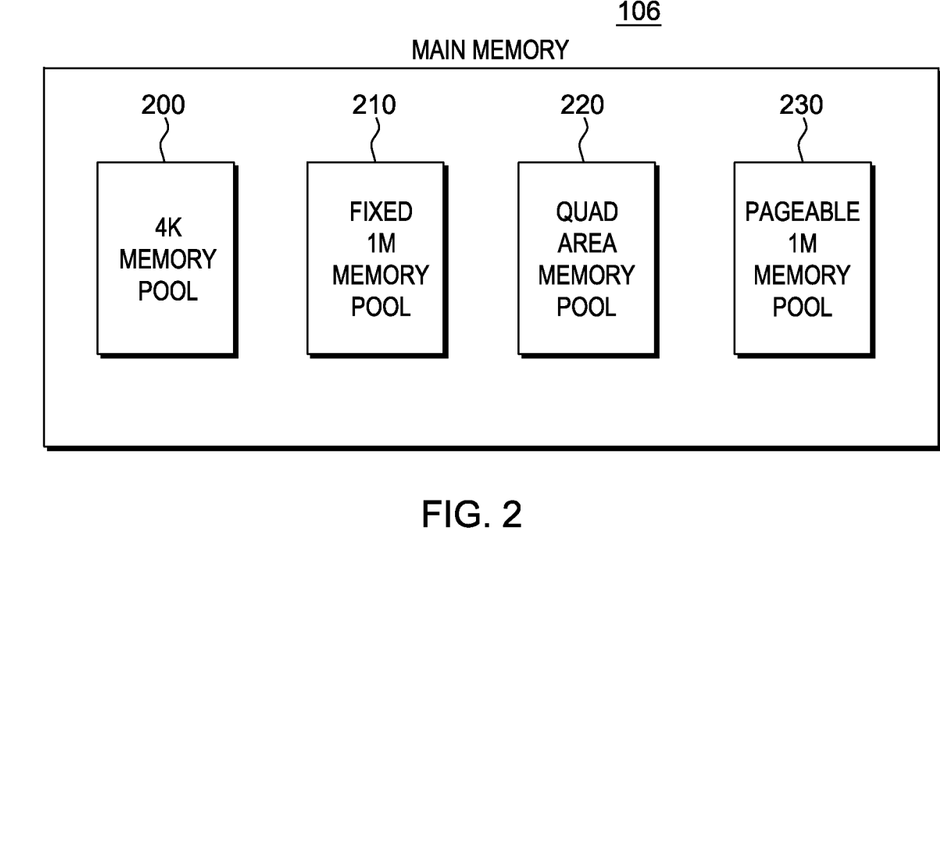
FIG. 2 depicts examples of memory pools in main memory, in accordance with an aspect of the present invention.

In one example, main memory 106 includes a plurality of memory pools, as depicted in FIG. 2. For instance, main memory 106 includes a 4K memory pool 200 used to satisfy requests (e.g., from the operating system and applications) for 4K page frames (a frame is the real memory backing the requested page); a fixed 1M memory pool 210 used to satisfy requests for fixed 1M large page frames; a quad area memory pool 220 used to manage four contiguous 4K frames in physical memory; and in accordance with an aspect of the present invention, a pageable 1M memory pool 230 used to service pageable 1M page frame requests.

Unlike fixed 1M page frames, pageable 1M page frames are backed at page fault time (not at allocation time) and can be paged out to auxiliary storage. In addition, a request for a pageable 1M page frame is a suggested preference to how the storage should be backed; however, there is no guarantee that it will be backed with 1M page frames. For fixed 1M page frame requests, the requests are to be backed with fixed 1M page frames at allocation time or the request fails.

When a request is received for a page frame of a particular size, a search is performed in one or more memory pools for the requested frame. The memory pools are searched, in accordance with an aspect of the present invention, in a defined order that is based on the requested size of the frame. One embodiment of a search order to satisfy 4K page frame requests is:

I. Allocate from the 4K available page frame pool;
  II. Allocate from the available pageable 1M pool;
  III. Allocate from the available quad area pool; and
  IV. Allocate from the available fixed 1M pool.

In one example, the pool order is further based on the restrictive nature of the page frame. The real storage manager uses the less restrictive page frames first. Thus, when memory demand shifts back to 1M page frames, the requests are more likely to be satisfied. Unlike fixed 1M page requests, pageable 1M page frames do not necessarily have to be satisfied with pageable 1M page frames. This makes them more attractive candidates than fixed 1M page frames for demoting a 1M page frame to 256 4K page frames to satisfy 4K page requests.

One embodiment of the logic to use the above search order to service a request for a 4K page frame is described with reference to FIG. 3. In one example, the real storage manager performs this logic.

Figure 3:
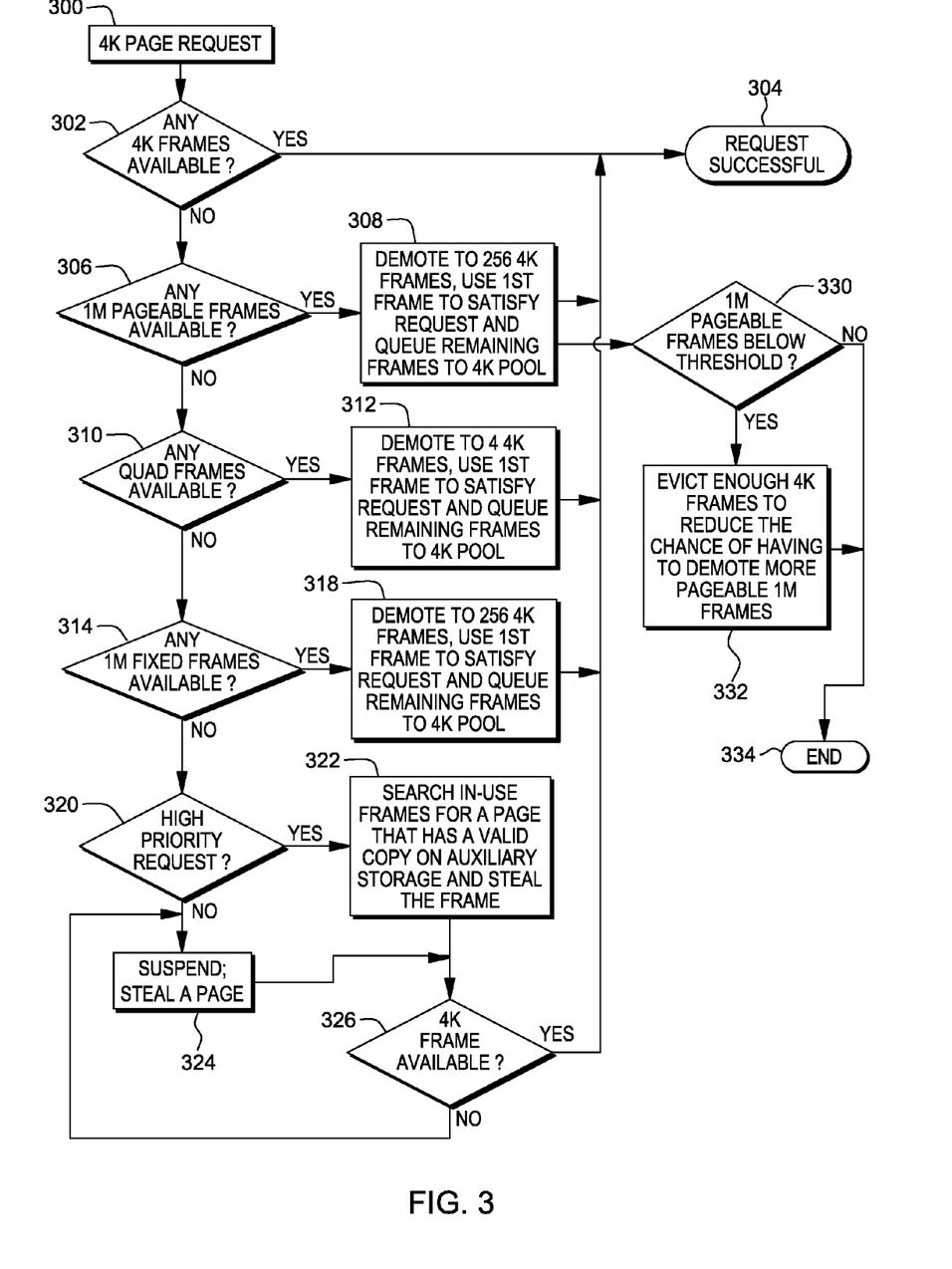
FIG. 3 depicts one embodiment of the logic to service a request for a 4K page frame, in accordance with an aspect of the present invention.

Referring to FIG. 3, responsive to the real storage manager receiving a request for a 4K page of real memory (e.g., due to a page fault), STEP 300, a determination is made as to whether there are any 4K frames available in the 4K memory pool, INQUIRY 302. If there are 4K frames available, then the request is successful, STEP 304. However, if there are no 4K frames available, a further determination is made as to whether there are any pageable 1M frames available in the pageable 1M memory pool, INQUIRY 306. If there are pageable 1M frames available, then a pageable 1M frame is selected from the pageable 1M memory pool and is demoted to a plurality of frames (e.g., 256 4K frames), STEP 308. Then, one of those frames (e.g., the first frame) is selected to satisfy the request and the remaining frames are queued to the 4K memory pool. The request is successful, STEP 304.

Returning to INQUIRY 306, if there are no pageable 1M frames available, then another determination is made as to whether there are any quad frames available in the quad area memory pool, INQUIRY 310. If there is at least one quad frame available, then a selected quad frame is demoted to a plurality of frames (e.g., four 4K frames), STEP 312. One frame (e.g., the first frame) is used to satisfy the request and the remaining frames are queued to the 4K memory pool. The request is successful, STEP 304.

Returning to INQUIRY 310, if there are no quad frames available, then a further determination is made as to whether there are any fixed 1M frames available in the fixed 1M memory pool, INQUIRY 314. If there is at least one fixed 1M frame available, then a selected fixed 1M frame is demoted to a plurality of frames (e.g., 256 4K frames), STEP 318. One frame (e.g., the first frame) is used to satisfy the request and the remaining frames are queued to the 4K memory pool. The request is successful, STEP 304.

If, after completing the search order of the 4K memory pool, the pageable 1M memory pool, the quad area memory pool, and the fixed 1M memory pool, and there are no frames available, a determination is made as to whether the request is a high priority request, INQUIRY 320. If it is a high priority request, as specified by, for instance, an indicator, a search is performed of in-use frames for a page that has a valid copy on auxiliary storage and that page is stolen (e.g., a desirable in-use frame is selected, its data is copied to an available 4K frame enabling use of the desirable in-use frame), STEP 322. Thereafter, a determination is made as to whether a 4K frame is available, INQUIRY 326. If it is, the request is successful, STEP 304. Otherwise, processing continues to STEP 324, described below.

Returning to INQUIRY 320, if the request is a low priority request, the requestor is suspended/waits until a page is stolen, STEP 324, and then processing continues to INQUIRY 326.

Asynchronous to the above processing, in one example, in addition to demoting a pageable 1M frame to a plurality of frames, a determination is made as to whether the pageable 1M memory pool is below a selected threshold, INQUIRY 330. In one example, the selected threshold is 25%; i.e., e.g., if there is room in the pool for 100 pages, then the minimum threshold is 25 pages. If the pageable 1M memory pool is below the selected threshold, then one or more 4K frames are evicted from main memory to auxiliary storage to reduce the chance of having to demote more pageable 1M frames, STEP 332. That is, enough 4K frames are evicted to reduce the chance of having to demote. Thereafter, or if the pageable 1M memory pool is not below the threshold, processing is complete, STEP 334.

As described above, when demand for small (e.g., 4K) page frames exceeds the small frame memory pool, larger size page frames are demoted to meet the small page demand. When demand causes the pageable large page supply to reach a low threshold, the real storage manager evicts small page frames to auxiliary storage in order to replenish the small page pool. That is, the content of those pages being evicted is written to auxiliary storage, enabling the backing real memory frames to be available for allocation when requests are received.

In one example, to demote a large page (e.g., 1M page) to a plurality of small pages (e.g., 4K pages), control blocks associated with the large page are changed. For example, a 1M page has 256 contiguous 4K pages, and each 4K page has associated therewith a control block (e.g., page frame table entry). Within each control block is an identifier (e.g., QID) that specifies the type of page. Thus, to demote the 1M page to 256 4K pages, the QID of each of the 256 control blocks is changed from an identifier specifying a 1M page to an identifier specifying a 4K page.

In addition to servicing small page requests, other types of requests are serviced, such as requests for pageable large pages. In accordance with an aspect of the present invention, a defined order is used to search memory pools for frames that satisfy the request. Again, the search order is based on the requested size. For a pageable 1M page request, the search order includes:

I. Search available pageable 1M pool;
II. Search available fixed 1M pool; and
III. Search available 4K frame pool.

Figure 4:
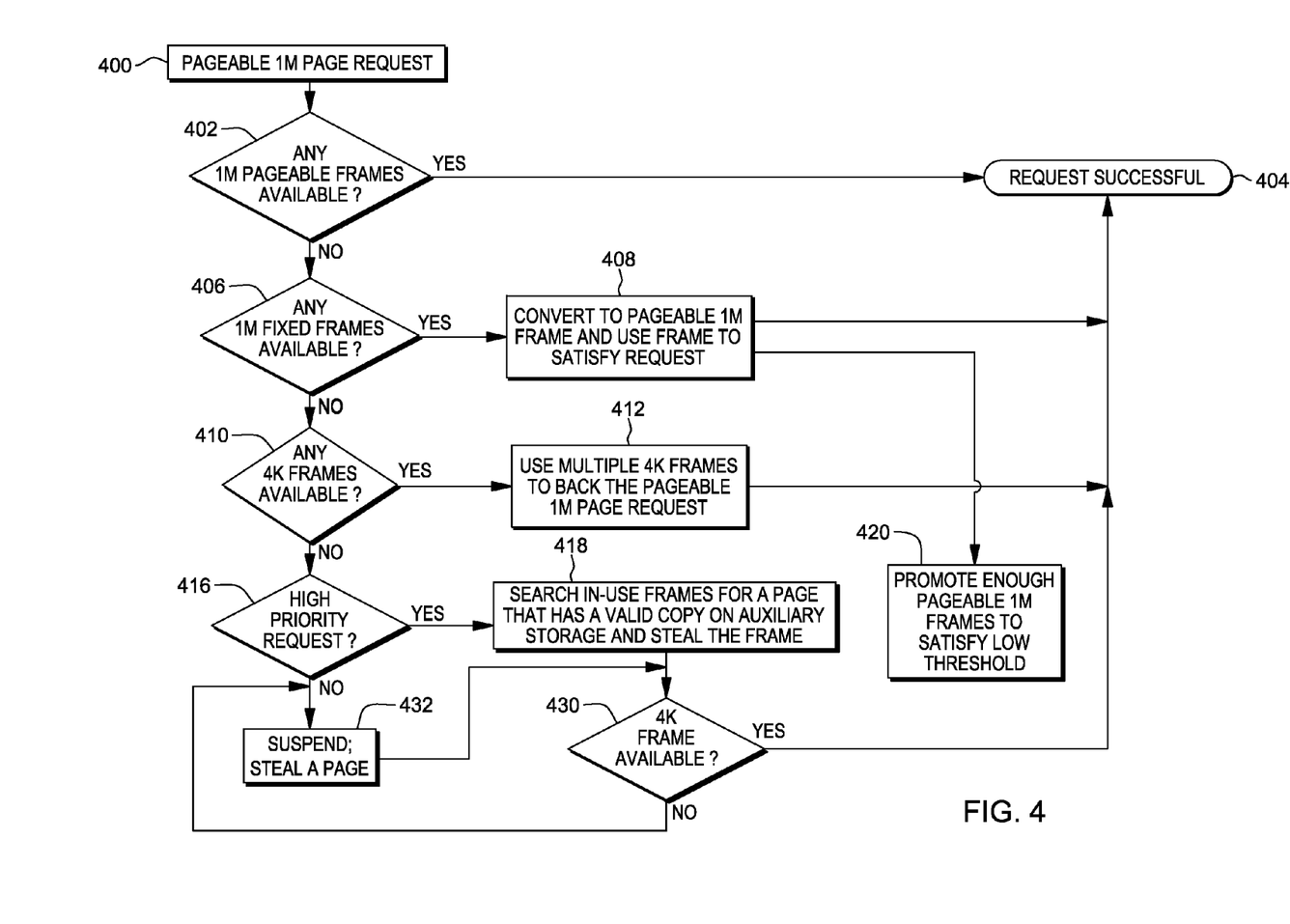
FIG. 4 depicts one embodiment of the logic to service a request for a 1M page frame, in accordance with an aspect of the present invention.

One embodiment of the logic to use the above search order to service a pageable 1M page request is described with reference to FIG. 4. In one example, it is the real storage manager that performs this logic.

Responsive to the real storage manager receiving a request for a pageable 1M page, STEP 400, the real storage manager determines whether any pageable 1M frames are available in the pageable 1M memory pool, INQUIRY 402. If there are pageable 1M frames available, then one is selected to service the request, and the request is successful, STEP 404. Otherwise, a further determination is made as to whether there are any fixed 1M frames available in the fixed 1M memory pool, INQUIRY 406. If there are fixed 1M frames available, then a selected fixed 1M frame is converted to a pageable 1M frame, STEP 408. In one example, this includes changing the QIDs in the control blocks representing the fixed 1M frame to a value indicating a pageable 1M frame. The converted frame is used to satisfy the request. The request is successful, STEP 404.

Returning to INQUIRY 406, if there are no fixed 1M frames available, then another determination is made as to whether there are any 4K frames available in the 4K memory pool, INQUIRY 410. If there are 4K frames available, then multiple 4K frames (e.g., 256) are used to back the pageable 1M page request, STEP 412. The request is successful, STEP 404.

Returning to INQUIRY 410, if there are no frames available in the pageable 1M memory pool and the fixed 1M memory pool and there are no or not enough frames in the 4K memory pool to service the request, a determination is made as to whether the request is a high priority request, INQUIRY 416. If it is a high priority request, as specified by, for instance, an indicator, a search is performed of in-use frames for a page that has a valid copy on auxiliary storage and that page is stolen, STEP 418. Thereafter, a determination is made as to whether a 4K frame is available, INQUIRY 430. If it is, the request is successful, STEP 404. Otherwise, processing continues to STEP 432, as described below.

Returning to INQUIRY 416, if the request is a low priority request, then the requestor is suspended/waits until a page is stolen, STEP 432, and then processing continues to INQUIRY 430.

Asynchronous to the above processing, in addition to STEP 408 in which the pageable 1M frame is converted and used to satisfy the request, a further action is performed in which enough pageable 1M frames are promoted to satisfy a low threshold (e.g., 25%), STEP 420. For example, a plurality (e.g., 256) of 4K frames are evicted from main memory to auxiliary storage so that the memory may be reclaimed as a 1M page. To reclaim the 4K pages as a 1M page, the QIDs of the 256 control blocks associated with the 256 4K pages are changed from a value indicating 4K to a value indicating 1M.

The real storage manager is able to use the 1M page frames defined in the fixed 1M pool as pageable 1M page frames due to the fact that these 1M page frames can be paged out to auxiliary storage. If there is a fixed 1M page frame request, the real storage manager can page out the pageable 1M page frame and then use it for a fixed 1M page frame.

When demand for pageable 1M page frames does exceed the pageable 1M memory pool, the real storage manager kicks off a service request block (SRB) that promotes enough pageable 1M page frames to reach a predefined threshold. This SRB is performed, in one example, to replenish the pageable 1M pool before the fixed 1M pool is exhausted leaving no 1M page frames available for 1M page frame requests.

In this example, fixed 1M page frame requests are only satisfied by fixed 1M page frames. However, in other examples, other types of page frames may be used to service requests for fixed 1M page frames.

Described in detail above is a capability for servicing page requests of different sizes. Depending on the requested page size, a predefined search order is used to search for memory frames to satisfy the request. Large pages are allowed to be used for small page consumption by demoting a large page into consumable small pages. Then, the small pages can be promoted back to a large page at a later time.

The selection process, in one example, is based on the least restrictive nature of the memory to the most restrictive nature. The pages that are easier to exchange or evict are chosen first, so that replenishment of large pages has a better chance of being successful. For instance, pageable storage is less restrictive than fixed storage. Similarly, non-preferred storage is less restrictive than preferred storage, since preferred storage, when in use, is not to be taken offline.

In one example, the search order is based on the requested size. For example, the search begins in a memory pool of the requested size and requested type. Then, if there is no available frame in that memory pool, the search continues. If there is another memory pool of the same size but a different type, then that memory pool is searched next. (If multiple types of memory pools of the same size, but different types exist, then one is selected for search based, for instance, on restrictions associated with the pools (e.g., pageable vs. fixed; or as other examples, 24, 31, or 64-bit storage; preferred vs non-preferred; etc.) A memory pool with less restrictions will be searched first, in this example.) If there are no more memory pools of the same size to be searched and an available frame has not been found, then if there is one or more memory pools with larger pages than the requested size, one of those is searched. In one example, the memory pool searched is based on the restrictions (e.g., less restrictive pool is searched first; e.g., pageable vs. fixed). The search continues until an available page is found or there are no more pools to be searched.

However, if there are no memory pools with larger pages than the requested size, then if there are one or more memory pools with smaller pages than the requested size, one of those is searched. Again, if there are multiple such pools, one with less restrictions is chosen for search. The search continues until an available page is found or there are no more pools to be searched.

Additional information relating to main memory and auxiliary storage is provided in the following commonly assigned applications co-filed herewith, each of which is hereby incorporated herein by reference in its entirety: U.S. Ser. No. 13/101,731, "MANAGING STORAGE EXTENTS AND THE OBTAINING OF STORAGE BLOCKS WITHIN THE EXTENTS"; U.S. Ser. No. 13/101,735, "MANAGING LARGE PAGE MEMORY POOLS"; and Ser. No. 13/101, 725, entitled "SELECTING AN AUXILIARY STORAGE MEDIUM FOR WRITING DATA OF REAL STORAGE PAGES".

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 5:
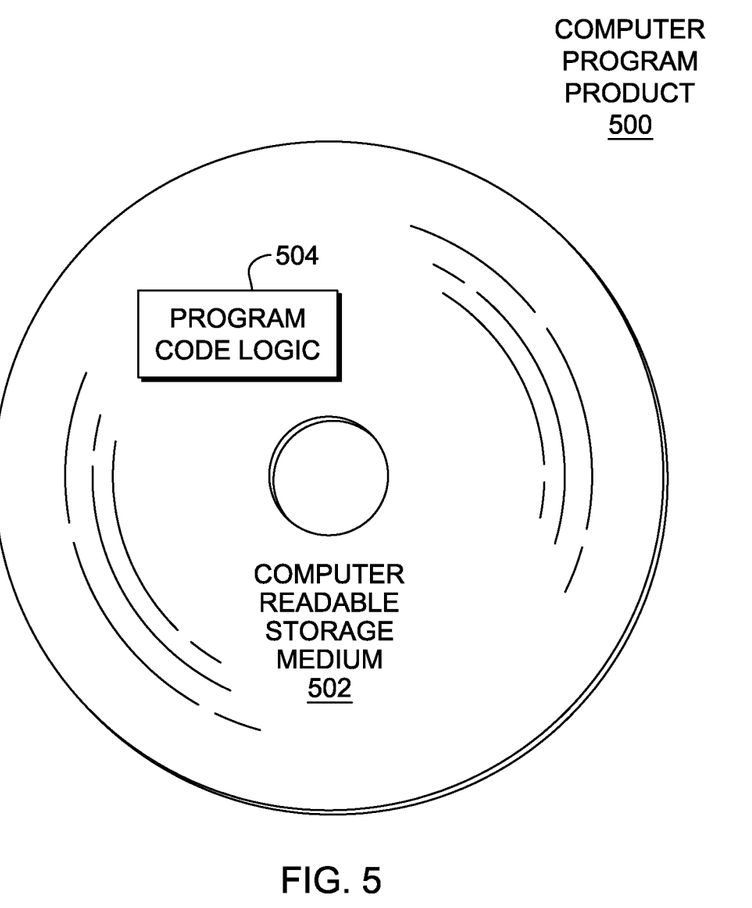
FIG. 5 depicts one embodiment of a computer program product to incorporate one or more aspects of the present invention.

Referring now to FIG. 5, in one example, a computer program product 500 includes, for instance, one or more non-transitory computer readable storage media 502 to store computer readable program code means or logic 504 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Additionally, although examples of auxiliary storage are described herein, other types of auxiliary storage may be used without departing from the spirit of the present invention. As used herein, auxiliary storage is any memory or storage other than main memory or its associated caches. Further, other types of storage-class memory may be used. One or more aspects of the present invention can be employed for storage block sizes other than 4K and 1M. Additionally, other predefined search orders may be used, and requests may be for page sizes other than 4K and 1M. Many variations exist and are considered a part of the claimed invention.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for allocating memory in a computing environment, said computer program product comprising:

a non-transitory computer readable storage medium readable by a processing circuit and storing instructions for execution by the processing circuit for performing a method comprising:

receiving a request for a page of memory of a requested size;

searching one or more memory pools for an available frame to service the request, the searching using a predefined order of search, the predefined order of search including multiple types of memory pools in a specific order based on the requested size of the page of memory, the searching terminating based on finding the available frame, and wherein the searching commences with a memory pool of the requested size, and based on the memory pool of the requested size failing to have an available frame, continuing next, depending on the requested size, to a memory pool having one or more frames of a greater size than the requested size or to a memory pool having one or more frames of an equal size but of a different type than the memory pool of the requested size; and
using the available frame to service the request.

2. The computer program product of claim 1, wherein the requested size is 4K, and the predefined order of search comprises:
4K memory pool;
pageable 1M memory pool;
quad memory pool; and
fixed 1M memory pool.

3. The computer program product of claim 2, wherein the available frame is found in the pageable 1M memory pool, and wherein the method further comprises:
demoting the available frame of the pageable 1M memory pool to a plurality of frames; and
wherein the using comprises using one frame of the plurality of frames resulting from demotion of the available frame to service the request.

4. The computer program product of claim 3, wherein the method further comprises:
determining whether the pageable 1M memory pool is below a defined threshold; and
based on the determining indicating the pageable 1M memory pool is below the defined threshold, evicting one or more frames from memory to auxiliary storage.

5. The computer program product of claim 2, wherein the available frame is found in the quad memory pool, and wherein the method further comprises:
demoting the available frame of the quad memory pool to a plurality of frames; and
wherein the using comprises using one frame of the plurality of frames resulting from demotion of the available frame to service the request.

6. The computer program product of claim 1, wherein the requested size is 1M, and the predefined order of search comprises:
pageable 1M memory pool;
fixed 1M memory pool; and
4K memory pool.

7. The computer program product of claim 6, wherein the available frame is found in the fixed 1M memory pool, and wherein the method further comprises:
converting the available frame of the fixed 1M memory pool to a pageable 1M frame; and
wherein the using comprises using the pageable 1M frame resulting from converting the available frame to service the request.

8. The computer program product of claim 6, wherein the available frame is found in the 4K memory pool, and the available frame includes a plurality of 4K frames of the 4K memory pool.

9. The computer program product of claim 1, wherein based on the requested size being such that the next memory pool to be searched includes one or more frames of a greater size than the requested size, continuing the search in a pageable large page memory pool, and then based on not yet finding an available frame in the pageable large page memory pool, continuing the search in a quad memory pool and then in a fixed large page memory pool, if needed.

10. The computer program product of claim 1, wherein based on the requested size being such that the next memory pool to be searched includes one or more frames of an equal size but of a different type, continuing the search in a fixed large page memory pool, and then based on not finding an available frame, to a memory pool having small pages.

11. A computer system for allocating memory in a computing environment, said computer system comprising:
a memory; and
a processor in communications with the memory, wherein the computer system is configured to perform a method, said method comprising:
receiving a request for a page of memory of a requested size;
searching one or more memory pools for an available frame to service the request, the searching using a predefined order of search, the predefined order of search including multiple types of memory pools in a specific order based on the requested size of the page of memory, the searching terminating based on finding the available frame, and wherein the searching commences with a memory pool of the requested size, and based on the memory pool of the requested size failing to have an available frame, continuing next, depending on the requested size, to a memory pool having one or more frames of a greater size than the requested size or to a memory pool having one or more frames of an equal size but of a different type than the memory pool of the requested size; and
using the available frame to service the request.

12. The computer system of claim 11, wherein the requested size is 4K, and the predefined order of search comprises:
4K memory pool;
pageable 1M memory pool;
quad memory pool; and
fixed 1M memory pool.

13. The computer system of claim 12, wherein the available frame is found in the pageable 1M memory pool, and wherein the method further comprises:
demoting the available frame of the pageable 1M memory pool to a plurality of frames; and
wherein the using comprises using one frame of the plurality of frames resulting from demotion of the available frame to service the request.

14. The computer system of claim 11, wherein the requested size is 1M, and the predefined order of search comprises:
pageable 1M memory pool;
fixed 1M memory pool; and
4K memory pool.

15. The computer system of claim 14, wherein the available frame is found in the fixed 1M memory pool, and wherein the method further comprises:
converting the available frame of the fixed 1M memory pool to a pageable 1M frame; and
wherein the using comprises using the pageable 1M frame resulting from converting the available frame to service the request.

16. A method of allocating memory in a computing environment, said method comprising:
receiving, by a processor, a request for a page of memory of a requested size;
searching, by the processor, one or more memory pools for an available frame to service the request, the searching using a predefined order of search, the predefined order of search including multiple types of memory pools in a specific order based on the requested size of the page of memory, the searching terminating based on finding the available frame, and wherein the searching commences with a memory pool of the requested size, and based on the memory pool of the requested size failing to have an available frame, continuing next, depending on the requested size, to a memory pool having one or more frames of a greater size than the requested size or to a memory pool having one or more frames of an equal size but of a different type than the memory pool of the requested size; and using, by the processor, the available frame to service the request.

17. The method of claim 16, wherein the requested size is 4K, and the predefined order of search comprises:
4K memory pool;
pageable 1M memory pool;
quad memory pool; and
fixed 1M memory pool.

18. The method of claim 17, wherein the requested size is 1M, and the predefined order of search comprises:
pageable 1M memory pool;
fixed 1M memory pool; and
4K memory pool.

19. The computer program product of claim 1, wherein based on the requested size being a small page, continuing next to a memory pool having one or more frames of a greater size, and based on the requested size being a large page, continuing next to a memory pool having one or more frames of an equal size but of a different type.

20. The computer program product of claim 1, wherein:
based on the requested size being such that the next memory pool to be searched includes one or more frames of a greater size than the requested size, continuing the search in a pageable large page memory pool, and then, based on not yet finding an available frame in the pageable large page memory pool, continuing the search in at least one more restrictive memory pool, including at least one of a quad memory pool and a fixed large page memory pool; and based on the requested size being such that the next memory pool to be searched includes one or more frames of an equal size but of a different type, continuing the search in a fixed large page memory pool, and then based on not finding an available frame, continuing the search in a small page memory pool.

* * * * *

UNITED STATES PATENT AND TRADEMARK OFFICE
CERTIFICATE OF CORRECTION

PATENT NO.       : 8,799,611 B2
APPLICATION NO.  : 13/101791
DATED            : August 5, 2014
INVENTOR(S)      : Alfred F. Foster et al.

It is certified that error appears in the above-identified patent and that said Letters Patent is hereby corrected as shown below:

On the title page

In the Inventors item (75): Delete "David Horn" and insert --David Hom--

Signed and Sealed this
Nineteenth Day of May, 2015

Michelle K. Lee
*Director of the United States Patent and Trademark Office*